(12) United States Patent
Mookerjee et al.

(10) Patent No.: US 7,719,461 B1
(45) Date of Patent: May 18, 2010

(54) TRACK FUSION BY OPTIMAL REDUCED STATE ESTIMATION IN MULTI-SENSOR ENVIRONMENT WITH LIMITED-BANDWIDTH COMMUNICATION PATH

(75) Inventors: Purusottam Mookerjee, Bridgewater, NJ (US); Frank J. Reifler, Cinnaminson, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 123 days.

(21) Appl. No.: 12/186,227

(22) Filed: Aug. 5, 2008

(51) Int. Cl.
*G01S 13/66* (2006.01)
(52) U.S. Cl. .............................. 342/95; 342/59; 342/96; 342/97; 342/90; 342/107; 342/108; 342/113; 342/115; 342/133; 342/135; 342/139; 342/140; 342/145; 342/146; 342/189; 342/195
(58) Field of Classification Search .................. 342/59, 342/90, 95–97, 107–109, 113–115, 133, 342/135, 139–140, 145–148, 162, 189, 194–195
See application file for complete search history.

(56) References Cited

U.S. PATENT DOCUMENTS

| | | | | |
|---|---|---|---|---|
| 5,325,098 | A * | 6/1994 | Blair et al. | 342/95 |
| 5,525,995 | A * | 6/1996 | Benner | 342/90 |
| 6,292,136 | B1 * | 9/2001 | Egnell | 342/432 |
| 6,577,976 | B1 * | 6/2003 | Hoff et al. | 702/95 |
| 7,009,554 | B1 * | 3/2006 | Mookerjee et al. | 342/195 |
| 7,180,443 | B1 * | 2/2007 | Mookerjee et al. | 342/195 |
| 7,248,206 | B1 * | 7/2007 | Boka et al. | 342/90 |
| 7,277,047 | B1 * | 10/2007 | Mookerjee et al. | 342/195 |
| 7,375,679 | B1 * | 5/2008 | Mookerjee et al. | 342/195 |
| 2003/0085840 | A1 * | 5/2003 | Benner et al. | 342/450 |
| 2005/0035900 | A1 * | 2/2005 | Zaugg et al. | 342/95 |
| 2005/0258957 | A1 * | 11/2005 | Krumm et al. | 340/539.13 |
| 2005/0270236 | A1 * | 12/2005 | Krumm et al. | 342/451 |

OTHER PUBLICATIONS

Bar-Shalom, Y., Campo, L. "The Effect of the Common Process Noise on the Two-Sensor Fused-Track Covariance", IEEE Transactions on Aerospace and Electronic Systems, 22, 6 (Nov. 1986), 803-805.

Chong, C.Y., Mori, S., Barker, W.H., Chang, K.C. "Architectures and Algorithms for Track Association and Fusion", IEEE AES Systems Magazine, Jan. 5-13, 2000.

(Continued)

*Primary Examiner*—John B Sotomayor
(74) *Attorney, Agent, or Firm*—Duane Morris LLP

(57) ABSTRACT

The invention, called "ORSE Track Fusion", combines sensor tracks from dispersed sites, when limited communication bandwidth does not permit sharing of individual measurements. Since estimation errors due to maneuver biases are not independent for each sensor, optimal fusion of tracks produced by Kalman filters requires transmission of all the filter gain matrices used to update each sensor track prior to the fusion time. For this reason, prior art has resorted to suboptimal designs. ORSE Track Fusion according to aspects of the invention overcomes this disadvantage by propagating, transmitting, and fusing separately calculated covariance matrices for random and bias estimation errors. Furthermore, with ORSE, each sensor can have its own criteria in forming its track, and track fusion can be performed with different criteria at each processing site. Thus, ORSE Track Fusion has the unique flexibility to optimize track fusion simultaneously for multiple criteria to serve multiple users.

20 Claims, 4 Drawing Sheets

OTHER PUBLICATIONS

Chang, K.C., Zhi, T., Saha, R.K., "Performance Evaluation of Track Fusion with Information Matrix Filter", IEEE Transactions on Aerospace and Electronic Systems, 38, 2 (Apr. 2002), 455-466.

Blair, W.D., Bar-Shalom, Y., "Tracking Maneuvering Targets with Multiple Sensors: Does More Data Always Mean Better Estimates?", IEEE Transactions on Aerospace and Electronic Systems, 32, 1 (Jan. 1996), 450-456.

Portmann, G.J., Moore, J.R., Bath, W.G., "Separated Covariance Filtering", Record of the IEEE 1990 International Radar Conference, 1990, 456-460.

Chen, H., Li, X.R., "On Track Fusion with Communication Constraints", Proceedings of the 10th International Conference on Information Fusion, Jul. 9-12, 2007.

Bar-Shalom, Y., Comments on "Comparison of two-sensor tracking methods based on state vector fusion and measurement fusion", IEEE Transactions on Aerospace and Electronic Systems, vol. 24, No. 4, Jul. 1998, pp. 456-457.

Bar-Shalom, Y., and Li X.R., Multitarget-Multisensor Tracking: Principles and Techniques, Storrs, CT: YBS Publishing, 1995, pp. 26-27.

Bar-Shalom, Y., Li, X.R., and Kirubarajan, T., Estimation with Applications to Tracking and Navigation: Theory Algorithms and Software, New York, NY: John Wiley & Sons, Inc., 2001, pp. 232-234, 422, 529.

Bar-Shalom, Y., Updated with Out-of-Sequence Measurements in Tracking: Exact Solution, IEEE Transactions on Aerospace and Electronic Systems, vol. 38, No. 3, Jul. 2002, pp. 769-778.

Bar-Shalom, Y., Mallick, M., Chen, H., and Washburn, R., One-Step Solution for the General Out-of-SequenceMeasurement Problem in Tracking, Proceedings of 2002 IEEE Aerospace Conference, vol. 4, pp. 1551-1559.

Beugnon, C., Singh, T., Llinas, J., and Saha, R.K., Adaptive Track Fusion in a Multisensor Environment, Proceedings of the 3rd International Conference on Information Fusion 2000, vol. 1, Jul. 10-13, 2000, pp. TuC2-24 - TuC31.

Chang, K.C., Saha, R.K., Bar-Shalom, Y., and Alford, M., Performance Evaluation of Multisensor Track-to-Track Fusion, Proceedings of the 1996 IEEE/SICE/RSJ International Conference on Multisensor Fusion and Integration for Intelligent Systems, Dec. 1996, pp. 627-632.

Chang, K.C., Saha, R.K., and Bar-Shalom, Y., on Optimal Track-to-Track Fusion, IEEE Transactions on Aerospace and Electronic Systems, vol. 33, No. 4, Oct. 1997, pp. 1271-1276.

Chang, K.C., Tian, Z., Mori, S., and Chong, C.Y., Performance Evaluation for Map State Estimate Fusion, IEEE Transactions on Aerospace and Electronic Systems, vol. 40, No. 2, Apr. 2004, pp. 706-714.

Chen, H., Kirubarajan, T., and Bar-Shalom, Y., Performance Limits of Track-to-Track Fusion versus Centralized Estimation: Theory and Application., IEEE Transactions on Aerospace and Electronic Systems, vol. 39, No. 2, Apr. 2003, pp. 386-400.

Gan, Q., and Harris, C.J., Comparison of Two Measurement Fusion Methods for Kalman-Filter-Based Multisensor Data Fusion, IEEE Transactions on Aerospace and Electronic Systems, vol. 37, No. 1, Jan. 2001, pp. 273-280.

Hall, D.L., and Llinas, J., an Introduction to Multisensor Data Fusion, Proceedings of the IEEE vol. 85, No. 1, Jan. 1997, pp. 6-23.

Haimovich, A.M., Yosko, J., Greenberg, R.J., Parisi, M.A. And Becker, D., Comparison of Two Measurement Fusion Methods for Kalman-Filter-Based Multisensor Data Fusion, IEEE Transactions on Aerospace and Electronic Systems, vol. 29, No. 1, Jan. 1993, pp. 245-250.

Kalandros, M.K., Trailovic, L., Pao, L.Y., and Bar-Shalom, Y., Tutorial on Multisensor Management and Fusion Algorithms for Target Tracking, Proceedings of the 2004 American Control Conference, vol. 1, Jun. 30 - Jul. 2, 2004, pp. 4734-4748.

Lin, X., Bar-Shalom, Y., and Kirubarajan, T., Exact Multisensor Dynamic Bias Estimation with Local Tracks, IEEE Transactions on Aerospace and Electronic Systems, vol. 40, No. 2, Apr. 2004, 576-590.

Malakian, K., and Vidmar, A., New Track-to-Track Association Logic for Almost Identical Multiple Sensors, Proceedings of 3rd National Symposium on Sensor Fusion, Orlando, FL, Apr. 1990, SPIE vol. 1481, Signal and Data Processing of Small Targets 1991, pp. 315-328.

Mookerjee, P., and Reifler, F., Reduced State Estimator for Systems with Parametric Inputs, IEEE Transactions on Aerospace and Electronic Systems, vol. 40, No. 2, Apr. 2004, pp. 446-461.

Mookerjee, P., and Reifler, F., Application of Reduced State Estimation to Multisensor Fusion with Out-of-Sequence Measurements, Proceedings of 2004 IEEE Radar Conference, Philadelphia, PA, Apr. 2004, pp. 111-116.

Mookerjee, P., and Reifler, F., Reduced State Estimators for Consistent Tracking of Maneuvering Targets, IEEE Transactions on Aerospace and Electronic Systems, vol. 41, No. 2, Apr. 2005, pp. 608-619.

Moore, J.R., and Blair, W.D., Practical aspects of Multisensor Tracking, in Bar-Shalom, Y., and Blair, W.D, (Eds.), Multitarget-Multisensor Tracking: Applications and Advances, vol. III, Boston, MA: Artech House, 2000, pp. 43-44.

Okello, N.N., and Challa, S., Joint Sensor Registration and Track-to-Track Fusion for Distributed Trackers, IEEE Transactions on Aerospace and Electronic Systems, vol. 40, No. 3, Jul. 2004, pp. 808-823.

Roecker, J., and McGillem, C.D., Comparison of Two-Sensor Tracking Methods Based on State Vector Fusion and Measurement Fusion, IEEE Transactions on Aerospace and Electronic Systems, vol. 24, No. 4, Jul. 1988, pp. 447-449.

Saha, R.K., Track-to-Track Fusion with Dissimilar Sensors, IEEE Transactions on Aerospace and Electronic Systems, vol. 32, No. 3, Jul. 1996, pp. 1021-1029.

Saha, R.K., An Efficient Algorithm for Multisensor Track Fusion, IEEE Transactions on Aerospace and Electronic Systems, vol. 34, No. 1, Jan. 1998, pp. 200-210.

\* cited by examiner

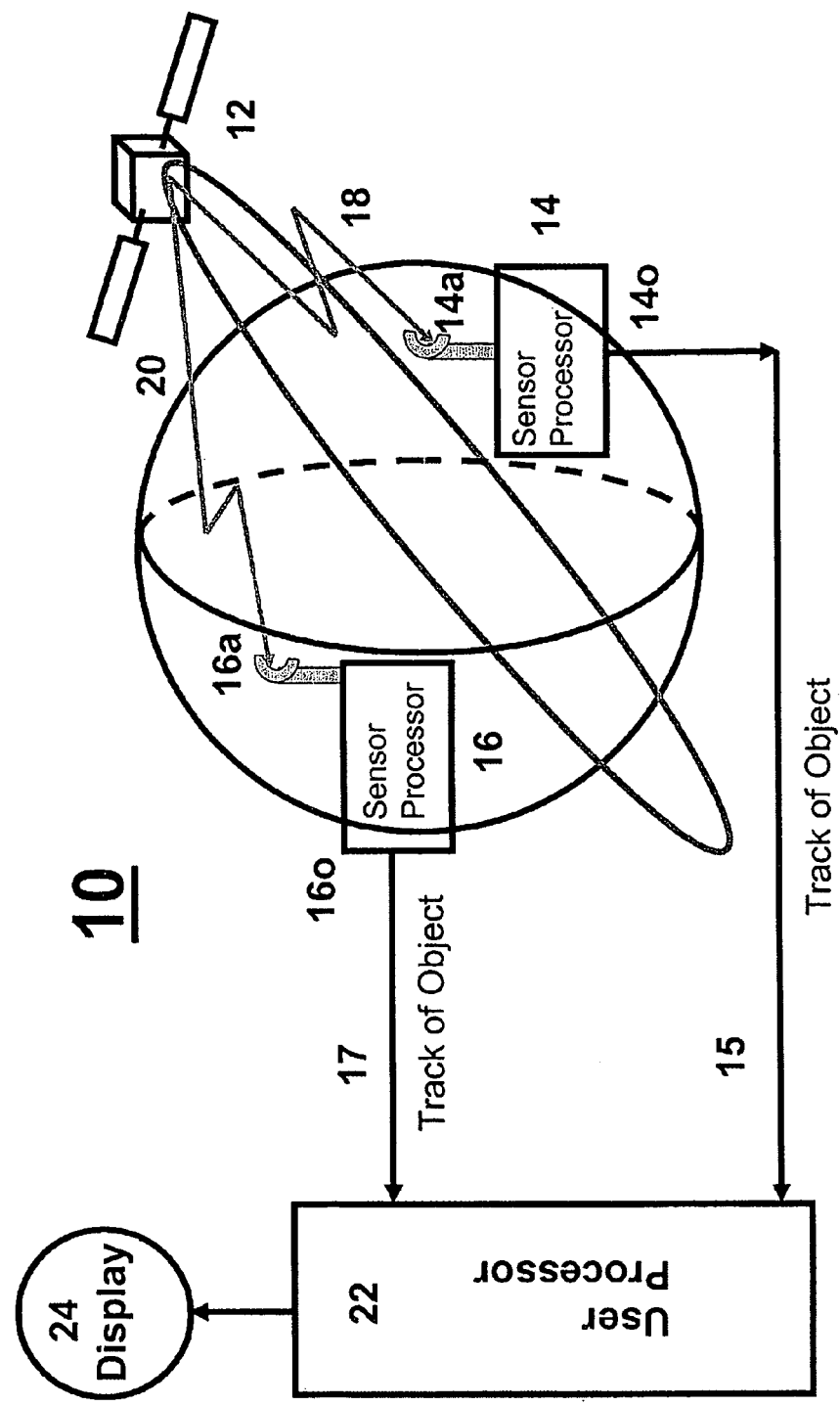
Figure 1 : Sensor and User Processors

Figure 2. Definition of variables used in ORSE Track Fusion

| | |
|---|---|
| $\Phi(T, x, \lambda)$ | System transition function describing the target dynamics |
| $T$ | Variable time between observations |
| $x$ | Target state vector |
| $\lambda$ | Parameter vector |
| $\bar{\lambda}$ | Mean value of parameter vector |
| $\Lambda, \Lambda_i$ | Covariance matrices of parameter vector |
| $\hat{x}_i(k \mid m)$ | State estimate provided by the $i^{th}$ sensor predicted to its $k^{th}$ discrete time after updating $m$ measurements |
| $M_i(k \mid m)$ | State covariance matrix provided by the $i^{th}$ sensor predicted to its $k^{th}$ discrete time after updating $m$ measurements due to measurement noise |
| $D_i(k \mid m)$ | Matrix of bias coefficients provided by the $i^{th}$ sensor predicted to its $k^{th}$ discrete time after updating $m$ measurements due to uncertain target parameters |
| $E_i(k \mid m)$ | Matrix of bias coefficients provided by the $i^{th}$ sensor predicted to its $k^{th}$ discrete time after updating $m$ measurements due to the $i^{th}$ sensor's measurement biases |
| $R_i(k \mid m)$ | State covariance matrix provided by the $i^{th}$ sensor predicted to its $k^{th}$ discrete time after updating $m$ measurements due to measurement noise and biases only |
| $S_i(k \mid m)$ | Total state covariance provided by the $i^{th}$ sensor predicted to its $k^{th}$ discrete time after updating $m$ measurements |
| $z_i(k)$ | Measurement (if available) provided by the $i^{th}$ sensor at its $k^{th}$ discrete time |
| $B_i$ | Bias covariance matrix for sensor $i$ |
| $H_i, J_i$ | Measurement matrices of sensor $i$ |
| $N_i$ | Measurement noise covariance of sensor $i$ |
| $I$ | Identity matrix |

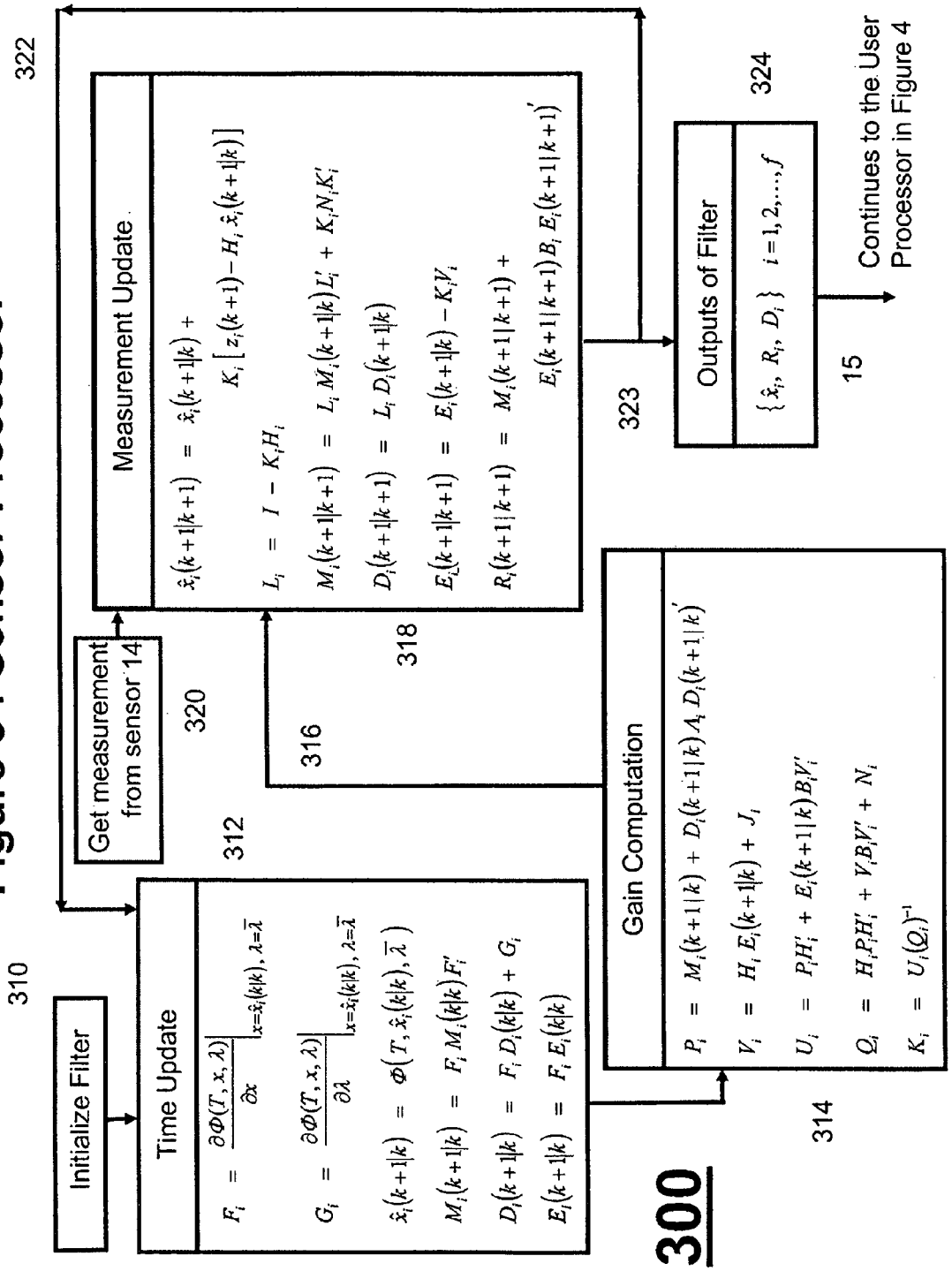

Figure 4 : User Processor
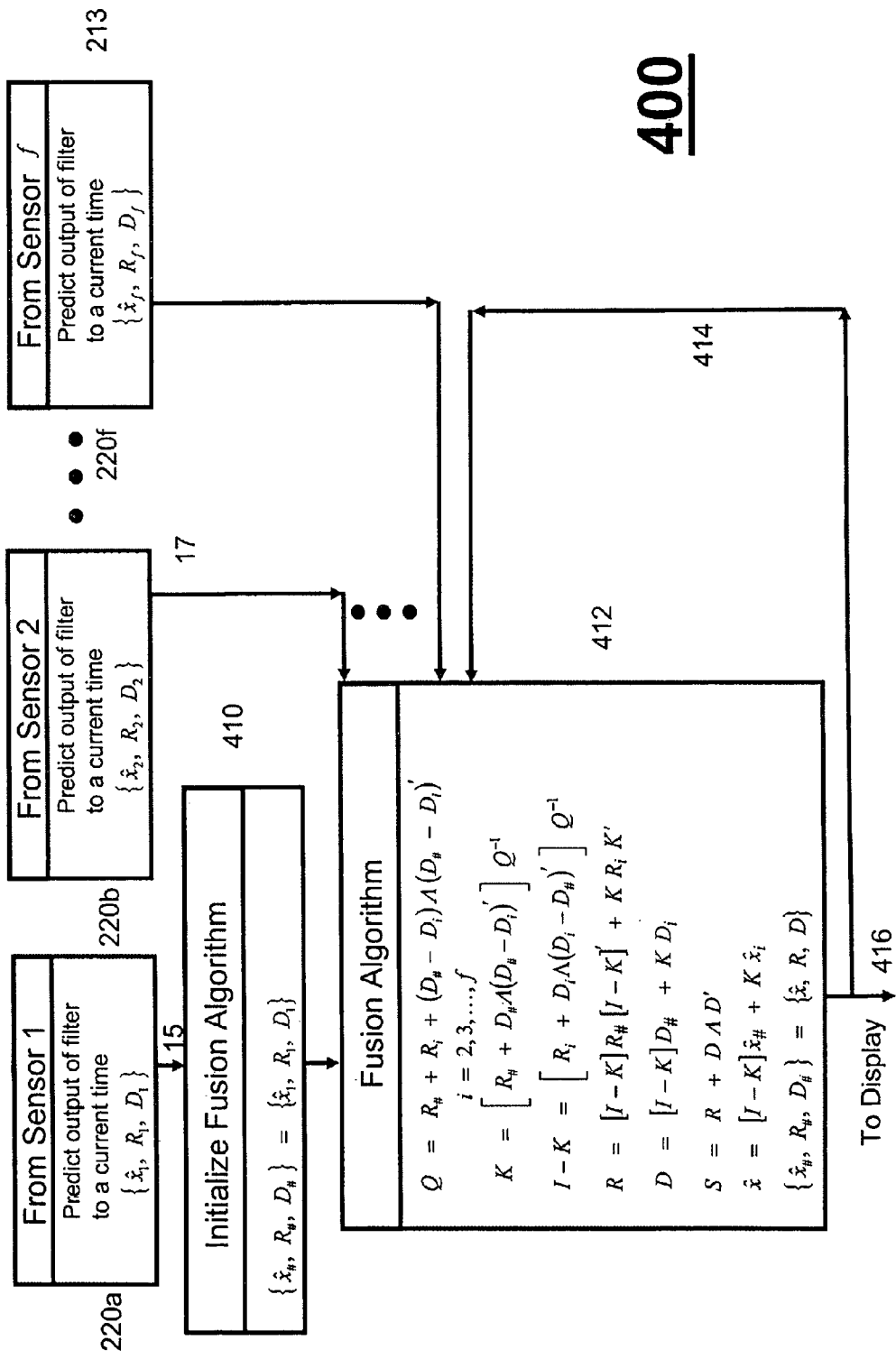

TRACK FUSION BY OPTIMAL REDUCED STATE ESTIMATION IN MULTI-SENSOR ENVIRONMENT WITH LIMITED-BANDWIDTH COMMUNICATION PATH

BACKGROUND OF THE INVENTION

FIG. 1 represents a simplified target tracking system 10 which tracks a target, illustrated as being an orbiting space object, such as a satellite 12, by the use of a sensor, such as a radar system 14. Those skilled in the art of tracking know that the word "target" refers to an object being tracked, and the target may be any object or vehicle, moving or stationary, such as an automobile, an aircraft, a ship, a submarine, a spacecraft, or even a person. Radar system 14 includes a radar antenna 14a, which transmits and receives radar signals illustrated by "lightning bolt" symbols 18. Portions of the transmitted signals 18 are reflected by target 12 and return to the radar antenna 14a. The returned signals allow the generation of measurements at an output port 14o of radar system 14. These measurements include values of at least some components of target position, possibly in the form of range and angles from the radar system 14. A track is generated from these measurements locally and consists of a track state, which may include, for example, course (direction of motion), speed, acceleration, and target type. This track is applied from radar system 14 by way of a transmission path 15 to a processing arrangement 22. A further radar system 16 at a different location includes an antenna 16a, which transmits and receives radar signals illustrated by "lightning bolt" symbols 20. Portions of the transmitted signals 20 are reflected by target 12, and return to antenna 16a. The returned signals allow the generation of measurements at an output port 16o of radar system 16. These measurements include values of at least some components of target position, possibly in the form of range and angles from the radar system 16. A track is generated from these measurements locally and consists a track state, which may include course (direction of motion), speed, acceleration, and target type. This track is applied from radar system 16 by way of a transmission path 17 to processing arrangement 22. Processing arrangement 22 receives the tracks relating to the target 12 and determines from these tracks the combined track of the target. The estimated position of the target, and possibly other information, is provided to a utilization apparatus or user, illustrated in this case as being a radar display 24. The operator (or possibly automated decision making equipment) can make decisions as to actions to be taken in response to the displayed information, including location information. It should be understood that the radar tracking system 10 of FIG. 1 is only one embodiment of a general class of estimation systems which may include controlling nuclear, chemical, or manufacturing factories or facilities, control processes subject to external parameter changes, attitude control of a space station subject to vibrations, traction control of an automobile subject to weather conditions, and the like.

It often happens in arrangements such as that of FIG. 1 that the bandwidths of the transmission paths 15 and 17 are limited, and there are multiple users of the limited bandwidth, so that the bandwidth available to any one user is also limited. Multiple sensors are often used to track a dynamic process from start to finish. An example of such tracking is the tracking of a target (man-made or natural) by radars or other sensors situated in geographically dispersed locations. Such a scenario would be commonplace in a land, water, air, or space situation. The radars or other sensors may report at the same time, or the reports may be interleaved, delayed, out-of-sequence, or refer to different portions of the trajectory of the target.

SUMMARY OF THE INVENTION

A method according to an aspect of the invention is for determining at least the location of a target, when limited communication bandwidth does not permit sharing of individual measurements from at least two sensors. The method comprising the steps of sensing the target with a first sensor at a location to produce a first set of measurements, and processing the first set of measurements by optimal reduced state estimation to thereby produce a first minimal set of target track information, including a first estimated state vector. The first minimal set of target track information includes at least an estimated location or position of the target as one of its components, as well as associated matrices, including a covariance matrix containing mean square errors of the first estimated state vector due to random and bias measurement errors, and a matrix of coefficients relating parameter uncertainty to state estimation error. The method further comprises the steps of sensing the target with at least a second sensor, at a second location, different from the first location, to produce a second set of measurements, and processing the second set of measurements by optimal reduced state estimation to thereby produce at least a second minimal set of target track information, including a second estimated state vector. The second minimal set of target track information includes at least an estimated location or position of the target as one of its components, as well as associated matrices, including a covariance matrix containing mean square errors of the second estimated state vector due to random and bias measurement errors, and a matrix of coefficients relating parameter uncertainty to state estimation error. The first and second minimal sets of target track information are transmitted by way of communication paths from the sensors to a user processing site at a location remote from the location of at least one of the sensors. At the user processing site, a parameter covariance matrix is selected according to the criteria of the user processing site. The parameter covariance matrix represents the physical bounds of time-varying parameters of the target which are unknown, but which are physically constrained to lie within known bounds, and which are distinct from the state variables that are being estimated. The first and second minimal sets of target track information are optimally fused, using the selected parameter covariance matrix, to produce fused information representing at least the estimated state of the target and the associated covariance. In a mode of the method, the step of transmitting the first and second minimal sets of track information by way of communication paths from the sensors may include the step of transmitting to a plurality of user processing sites. When there are a plurality of user processing sites, each user processing site may select its own parameter covariance matrix $\Lambda$, according to its own criteria or requirements. The step of processing measurements from the $i^{th}$ sensor (i=1, 2, 3, ...), may comprise the step of optimal reduced state estimation including the steps of:

determining the time updated state estimate by $$\hat{x}_i(k+1|k) = \Phi(T, \hat{x}_i(k|k), \overline{\lambda}) \qquad (1)$$

where $\hat{x}_i(k|k)$ is the estimate of the state vector x belonging to the estimator of the $i^{th}$ sensor at the discrete time index k, and $\Phi(T, x, \lambda)$ is the system transition function describing the target dynamics, T is a variable time between observations, and λ is a parameter vector whose mean value is $\bar{\lambda}$;

determining the matrices $F_i$ and $G_i$ by $$F_i = \left.\frac{\partial \Phi(T, x, \lambda)}{\partial x}\right|_{x=\hat{x}_i(k|k), \lambda=\bar{\lambda}} \quad (2)$$

$$G_i = \left.\frac{\partial \Phi(T, x, \lambda)}{\partial \lambda}\right|_{x=\hat{x}_i(k|k), \lambda=\bar{\lambda}}; \quad (3)$$

determining the time updated covariance of state estimate due to measurement noise by (' denotes matrix transpose)

$$M_i(k+1|k) = F_i M_i(k|k) F_i' \quad (4);$$

determining the time updated bias coefficients due to unmodeled dynamics by $$D_i(k+1|k) = F_i D_i(k|k) + G_i \quad (5);$$

determining the time updated bias coefficients due to sensor bias by $$E_i(k+1|k) = F_i E_i(k|k) \quad (6);$$

calculating intermediate variables $P_i$, $V_i$, $U_i$, $Q_i$ using the ORSE measurement matrices $H_i$, $J_i$, $B_i$, and $N_i$ according to $$P_i = M_i(k+1|k) + D_i(k+1|k) \Lambda_i D_i(k+1|k)' \quad (7)$$

$$V_i = H_i E_i(k+1|k) + J_i \quad (8)$$

$$U_i = P_i H_i' + E_i(k+1|k) B_i V_i' \quad (9)$$

$$Q_i = H_i P_i H_i' + V_i B_i V_i' + N_i \quad (10);$$

computing the fusion gain as $$K_i = U_i (Q_i)^{-1} \quad (11);$$

performing measurement update of the states and associated matrices using the measurement $z_i(k+1)$ according to (I denotes the identity matrix)

$$\hat{x}_i(k+1|k+1) = \hat{x}_i(k+1|k) + K_i [z_i(k+1) - H_i \hat{x}_i(k+1|k)] \quad (12)$$

$$L_i = I - K_i H_i \quad (13)$$

$$M_i(k+1|k+1) = L_i M_i(k+1|k) L_i' + K_i N_i K_i' \quad (14)$$

$$D_i(k+1|k+1) = L_i D_i(k+1|k) \quad (15)$$

$$E_i(k+1|k+1) = E_i(k+1|k) - K_i V_i \quad (16)$$

$$R_i(k+1|k+1) = M_i(k+1|k+1) + E_i(k+1|k+1) B_i E_i(k+1|k+1)' \quad (17)$$

to thereby predict the limited-information-bandwidth 3-tuples $\{\hat{x}_i, R_i, D_i\}$ of track information for each sensor to a current time.

The step of optimally fusing to produce fused information representing at least the state and the covariance of the target may include the steps of:

initializing an optimal fusion algorithm by, for the first sensor, initializing $$\{\hat{x}_\#, R_\#, D_\#\} = \{\hat{x}_1, R_1, D_1\}$$

and combining with the second sensor according to $$Q = R_\# + R_2 + (D_\# - D_2) \Lambda (D_\# - D_2)' \quad (19)$$

$$K = [R_\# + D_\# \Lambda (D_\# - D_2)'] Q^{-1} \quad (20)$$

$$I - K = [R_2 + D_2 \Lambda (D_2 - D_\#)'] Q^{-1} \quad (21)$$

$$R = [I-K] R_\# [I-K]' + K R_2 K' \quad (22)$$

$$D = [I-K] D_\# + K D_2 \quad (23)$$

$$S = R + D \Lambda D' \quad (24)$$

$$\hat{x} = [I-K] \hat{x}_\# + K \hat{x}_2 \quad (25)$$

and yielding $\{\hat{x}, R, D\}$ as the output.

A method according to any mode of the invention may include the step of displaying the location of the target, and the target may be any object, movable or stationary, including a vehicle(s) or person.

A method according to another aspect of the invention is for determining at least the location of a target, when limited communication bandwidth does not permit sharing of individual measurements from a plurality of sensors including at least two sensors. The method comprises the steps of sensing the target with a first sensor at a location to produce a first set of measurements, and processing the first set of measurements by optimal reduced state estimation to thereby produce a first minimal set of target track information. The first minimal set of target track information includes a first estimated state vector, with at least an estimated location or position of the target as one of its components, as well as associated matrices, including a covariance matrix containing mean square errors of the first estimated state vector due to random and bias measurement errors, and a matrix of coefficients relating parameter uncertainty to state estimation error. The method further comprises the step of sensing the target with at least a second sensor, at a second location, different from the first location, to produce a second set of measurements, and processing the second set of measurements by optimal reduced state estimation to thereby produce at least a second minimal set of target track information. The second minimal set of target track information includes a second estimated state vector, with at least an estimated location or position of the target as one of its components, as well as associated matrices, including a covariance matrix containing mean square errors of the second estimated state vector due to random and bias measurement errors, and a matrix of coefficients relating parameter uncertainty to state estimation error. The first and second minimal sets of track information are transmitted by way of communication paths from each sensor to at least one user processing site at a location remote from the location of at least one of the sensors. At the user processing site, a parameter covariance matrix is selected, according to the criteria or requirements of the user processing site. The parameter covariance matrix represents the physical bounds of time-varying parameters of the target which are unknown, but which are physically constrained to lie within known bounds, and which are distinct from the state variables that are being estimated. The first and second minimal sets of track information are optimally fused, using the selected parameter covariance matrix, to produce fused information representing at least the estimated state of the target and the associated covariance. The target is sensed with an additional sensor at a location to produce an additional set of measurements. The additional set of measurements are processed by optimal reduced state estimation to thereby produce an additional minimal set of target track information, including an additional estimated state vector, with at least an estimated location or position of the target as one of its components, as well as associated matrices, including a covariance matrix containing mean square errors of the additional estimated state vector due to random and bias measurement errors, and a matrix of coefficients relating parameter uncertainty to state estimation error. The additional minimal sets of track information are transmitted by way of communication paths from the additional sensor to the user processing site. The first, second, and additional minimal sets of track information are optimally fused, using the selected parameter covariance matrix, to produce fused information representing at least the estimated state of the target and the associated covariance. In a preferred mode of this method, the steps of sensing the target, processing by optimal reduced state estimation, transmitting, and optimally fusing are repeated until the track information from all sensors sensing a target are optimally fused, using the selected parameter covariance matrix at the user processing site, to produce fused information representing at least the estimated state of the target and the associated covariance. In a variant of this method, the step of transmitting the first and second minimal sets of track information by way of communication paths from each sensor may include the step of transmitting to a plurality of user processing sites, and in this variant, each user processing site may select its own parameter covariance matrix $\Lambda$, according to its own criteria or requirements. In a preferred mode of this method, the step of processing measurements from each sensor comprises the step of optimal reduced state estimation including the steps of:

determining the time updated state estimate by $$\hat{x}_i(k+1|k) = \Phi(T, \hat{x}_i(k|k), \overline{\lambda}) \tag{26}$$

where $\hat{x}_i(k|k)$ is the estimate of the state vector x belonging the estimator of the $i^{th}$ sensor at the discrete time index k, and $\Phi(T,x,\lambda)$ is the system transition function describing the target dynamics, T is a variable time between observations, and $\lambda$ is a parameter vector whose mean value is $\overline{\lambda}$;

determining the matrices $F_i$ and $G_i$ by $$F_i = \left. \frac{\partial \Phi(T, x, \lambda)}{\partial x} \right|_{x=\hat{x}_i(k|k), \lambda=\overline{\lambda}} \tag{27}$$

$$G_i = \left. \frac{\partial \Phi(T, x, \lambda)}{\partial \lambda} \right|_{x=\hat{x}_i(k|k), \lambda=\overline{\lambda}}; \tag{28}$$

determining the time updated covariance of state estimate due to measurement noise by (' denotes matrix transpose)

determining the time updated covariance of state estimate due to measurement noise by $$M_i(k+1|k) = F_i M_i(k|k) F_i' \tag{29};$$

determining the time updated bias coefficients due to unmodeled dynamics by $$D_i(k+1|k) = F_i D_i(k|k) + G_i \tag{30};$$

determining the time updated bias coefficients due to sensor bias by $$E_i(E+1|k) = F_i E_i(k|k) \tag{31}$$

calculating intermediate variables $P_i$, $V_i$, $U_i$, $Q_i$ using the ORSE measurement matrices $H_i$, $J_i$, $B_i$, and $N_i$ according to $$P_i = M_i(k+1|k) + D_i(k+1|k) \Lambda_i D_i(k+1|k)' \tag{32}$$

$$V_i = H_i E_i(k+1|k) + J_i \tag{33}$$

$$U_i = P_i H_i' + E_i(k+1|k) B_i V_i' \tag{34}$$

$$Q_i = H_i P_i H_i' + V_i B_i V_i' + N_i \tag{35};$$

computing the fusion gain as $$K_i = U_i (Q_i)^{-1} \tag{36}$$

performing measurement update of the states and associated matrices using the measurement $z_i(k+1)$ according to (I denotes the identity matrix)

$$\hat{x}_i(k+1|k+1) = \hat{x}_i(k+1|k) + K_i[z_i(k+1) - H_i \hat{x}_i(k+1|k)] \tag{37}$$

$$L_i = I - K_i H_i \tag{38}$$

$$M_i(k+1|k+1) = L_i M_i(k+1|k) L_i' + K_i N_i K_i' \tag{39}$$

$$D_i(k+1|k+1) = L_i D_i(k+1|k) \tag{40}$$

$$E_i(k+1|k+1) = E_i(k+1|k) - K_i V_i \tag{41}$$

$$R_i(k+1|k+1) = M_i(k+1|k+1) + E_i(k+1|k+1) B_i E_i(k+1|k+1)' \tag{42}$$

to thereby predict the limited-information-bandwidth 3-tuples $\{\hat{x}_i, R_i, D_i\}$ of track information for each sensor to a current time.

In a mode of this method, the step of optimally fusing as many sets of minimal track information as the number of sensors sensing the target to produce fused information representing at least the state and the covariance of the target includes the steps of:

initializing an optimal fusion algorithm by, for the first sensor, initializing $$\{\hat{x}_\#, R_\#, D_\#\} = \{\hat{x}_1, R_1, D_1\} \tag{43}$$

combining with the $i^{th}$ sensor; i=2, 3, 4, . . . according to $$Q = R_\# + R_i + (D_\# - D_i) \Lambda (D_\# - D_i)' \tag{44}$$

$$K = [R_\# + D_\# \Lambda (D_\# - D_i)'] Q^{-1} \tag{45}$$

$$I - K = [R_i + D_i \Lambda (D_i - D_\#)'] Q^{-1} \tag{46}$$

$$R = [I-K] R_\# [I-K]' + K R_i K' \tag{47}$$

$$D = [I-K] D_\# + K D_i \tag{48}$$

$$S = R + D \Lambda D' \tag{49}$$

$$\hat{x} = [I-K] \hat{x}_\# + K \hat{x}_i \tag{50}$$

Resetting $$R_\# = R \tag{51}$$

$$D_\# = D \tag{52}$$

$$\hat{x}_\# = \hat{x} \tag{53}$$

and looping back to (44) for the remaining sensor tracks until all tracks are fused and yielding $\{\hat{x}, R, D\}$ as the output.

BRIEF DESCRIPTION OF THE DRAWING

FIG. 1 depicts determination of the states of a target sensed by multiple individual sensors to generate a user display using fusion of ORSE tracks according to an aspect of the invention;

FIG. 2 illustrates a table defining variables used in analysis of ORSE Track Fusion processing according to an aspect of the invention;

FIG. 3 is a simplified block diagram of a system according to an aspect of the invention, in which one of plural target sensors produces target-related information, which requires less bandwidth for transmission over transmission paths;

FIG. 4 is a simplified logic or control flow chart or diagram illustrating fusion processing, according to an aspect of the invention, of the information transmitted from each sensor.

DESCRIPTION OF THE INVENTION

The invention relates generally to fusing tracks from multiple sensors, from dispersed sites, tracking a common target, when communication bandwidth does not permit sharing of individual measurements. Note that the word "target" herein refers to any object being tracked. The intent of track fusion is to maximize the information derived from the sensors while minimizing the information bandwidth on the communications link(s) between the sensors or from the sensors to a processing site. For example, if it were known that a target moves uniformly along a straight line, one could in principle identify an infinite number of positions along the straight line, or just a position and a velocity. The former method uses more information bandwidth to communicate the same information as the latter. The outputs associated with the individual sensor tracks are reported to a central processing site at a low rate, rather than reporting each measurement, which would require more bandwidth. As such, the number of bits (or words) required to be transmitted over the network paths, such as 15 and 17, is reduced. The tracks from each sensor are then predicted to a common time and fused to obtain combined estimated state vector and matrices, the intent of which is to characterize the combined errors of the individual tracks arriving from the respective sensor sites.

A key problem in track fusion designs is overcoming the difficulty that estimation errors due to maneuver biases are not independent for each sensor. Related reference is Y. Bar-Shalom and L. Campo (1986): The effect of the common process noise on the two-sensor fused-track covariance, *IEEE Transactions on Aerospace and Electronic Systems*, 22, 6 (November 1986), 803-805. In some prior art this difficulty could only be overcome in an optimal manner by transmitting all the filter gain matrices used to update each sensor track prior to the fusion time as stated in Page 8 of C. Y. Chong, S. Mori, W. H. Barker, and K. C. Chang in "Architectures and Algorithms for Track Association and Fusion", *IEEE AES Systems Magazine*, Jan. 2000, 5-13. However, transmitting the entire history of filter gain matrices defeats the purpose of track fusion, which is to reduce the bandwidth of the information that has to be exchanged across the communication link as stated by K. C. Chang, T. Zhi, and R. K. Saha (2002), "Performance Evaluation of Track Fusion with Information Matrix Filter", *IEEE Transactions on Aerospace and Electronic Systems*, 38, 2 (April, 2002), 455-466. For this reason, prior art has resorted to suboptimal designs. ORSE Track Fusion according to an aspect of the invention overcomes this disadvantage by propagating, transmitting, and fusing separately calculated covariance matrices for random and bias estimation errors. Furthermore, with ORSE, each sensor can have its own criteria in forming its track, and track fusion can be performed with different criteria at each processing site. Thus, ORSE Track Fusion has the unique flexibility to optimize track fusion simultaneously for multiple criteria to serve multiple users.

Track fusion is used to fuse information when multiple sensors, at dispersed sites, track a common target, and the communication bandwidth does not permit sharing of individual measurements. Track fusion in the prior art uses elemental Kalman filters, which suffer from three main difficulties, discussed below.

The first difficulty is that the white plant noise covariance in a Kalman filter designed to cope with target maneuvers must be optimized empirically. In tracking applications, the white plant noise covariance, W that gives optimal performance even in steady state depends not only on the maneuver bounds, $\Lambda$, but also on other variables such as the measurement noise covariance and the data rate. Even for a single sensor, the ratio of W to $\Lambda$ is seen in some examples to vary by more than two orders of magnitude. Designing the appropriate white plant noise for an elemental Kalman filter usually requires a great deal of empirical simulation. The approach taken according to aspects of the invention avoids simulation by more precise analytical modeling of the bounded physical inputs, instead of a white plant noise.

Kalman filters designed to cope with maneuvers must be specialized for each type of maneuver. This approach is impractical in general, and leads to cumbersome designs that are not robust and are the source of filtering paradoxes as stated by W. D. Blair and Y. Bar-Shalom in their paper entitled, "Tracking Maneuvering Targets with Multiple Sensors Does More Data Always Mean Better Estimates?" appeared in *IEEE Transactions on Aerospace and Electronic Systems*, 32, 1 (January 1996), 450-456. Our prior invention, on optimal reduced state estimation (ORSE) as described in U.S. Pat. No. 7,277,047, issued Oct. 2, 2007 and entitled "Reduced state estimation with biased measurements", has demonstrated that ORSE provides consistent and optimal estimation often lacking and difficult to attain with Kalman filters in multidimensional state estimation.

The second difficulty is that the covariance of the state vector provided at each filter update, must accurately characterize the estimation errors due to both measurement noise and parameter uncertainty when the filter is part of a decision process as noted in the paper entitled "Separated Covariance Filtering" by G. J. Portmann, J. R. Moore, and W. G. Bath and found in the Record of the *IEEE* 1990 *International Radar Conference*, 1990, pp. 456-460. The Kalman filter covariance does not properly characterize these estimation errors for maneuvering targets. This is known in the literature as lack of consistency of a Kalman filter in regard to tracking maneuvering targets. Embodiments according to aspects of the invention provide the consistency needed for decision processes.

The third difficulty is that the measurements from multiple sensors can have relative biases, which, if not properly accounted for, greatly degrade the estimation performance. These biases may lead to large transients when sensors are switched. The biases can depend on many factors, such as uncertain orientation of reference frames, calibration errors, flexure and stresses acting on the sensors, and refraction by the medium through which the signal travels. Therefore, as with maneuvers, the biases arbitrarily vary with time within known bounds. Embodiments according to aspects of the invention provide consistent and optimal estimates by including the physical bounds of the measurement biases when optimizing the fusion algorithms.

The above mentioned U.S. Pat. No. 7,277,047 applied optimal state estimation for this class of problems considering all random and bias errors, including the bounds on parameters $\lambda$, expressed by a parameter covariance $\Lambda$, as well as the bounds on the biases in the measurements, expressed by a measurement bias covariance $B_i$ for the $i^{th}$ sensor. The application of optimal state estimation necessitates more than just a simple substitution of ORSE filters for Kalman filters, but also requires fundamental changes to the track fusion algorithm itself.

We discuss below two algorithms which are commonly used in the prior art for track fusion. (a) Given two 2-tuples of state estimates and associated state covariances $\{\hat{x}_1, P_1\}, \{\hat{x}_1,$ $P_2$} characterizing two tracks at a common time, an algorithm for generating a fused track characterized by {$\hat{x}$, P} is given by C. Y. Chong, S. Mori, W. H. Barker, and K. C. Chang in "Architectures and Algorithms for Track Association and Fusion", *IEEE AES Systems Magazine*, January 2000, page 8:

$$\hat{x} = P(P_1^{-1}\hat{x}_1 + P_2^{-1}\hat{x}_2) \quad (54)$$

$$P = (P_1^{-1} + P_2^{-1})^{-1} \quad (55)$$

Although extensively used because of its simplicity this algorithm may not be optimal during target maneuvers. This is especially true when many sensors are tracking the object. As stated by Chen and Li, "When N [the number of sensors] is large, . . . each local tracker is unaware of the existence of other local trackers, which leads to the fused error covariance being dominated by the cross-covariance term." [Reference: H. Chen and X. R. Li (2007), "On Track Fusion with Communication Constraints", *Proceedings of 10th International Conference on Information Fusion*, Jul. 9-12, 2007.] The cross-covariance matrices $P_{12}$ and $P_{21} = P_{12}'$ between the two tracks is not taken into consideration in the above algorithm (54) and (55), leading to a suboptimal design. An optimal algorithm given by the earlier reference by Bar-Shalom and Campo states:

$$\hat{x} = \hat{x}_1 + (P_1 - P_{12})(P_1 + P_2 - P_{12} - P_{21})^{-1}(\hat{x}_2 - \hat{x}_1) \quad (56)$$

$$P = P_1 - P_1 - P_{12})(P_1 + P_2 - P_{12} - P_{21})^{-1}(P_1 - P_{21}) \quad (57)$$

requires a large number of bits (or words) to be sent across the data link in order to compute the cross covariances {$P_{12}$, $P_{21}$}. In general, the entire history of Kalman filter gains and observation matrices need to be communicated to the fusion (or user) site. Chong et al. affirm this aspect. Thus, optimal track fusion algorithms based on elemental Kalman filters are impractical because of the large amount of information bandwidth required. In addition, the difficulties caused by the inconsistency of the filter calculated covariances of the elemental Kalman filters carry over to the track fusion calculated covariance.

Embodiments according to aspects of the invention perform state estimation of a target having multidimensional time-varying parameters which are unknown, but physically constrained to lie within known bounds. These multidimensional unknown parameters are distinct from the state variables that are being estimated. According to an aspect of the invention, the target state is estimated when the target is being tracked at multiple sites by geometrically dispersed sensors, whose measurements are contaminated with random and bias errors, and with limited communication bandwidth that does not permit sharing of individual measurements.

Embodiments according to aspects of the invention optimize track fusion simultaneously for multiple criteria to serve multiple users with different requirements. For example, one user may wish to optimize the track fusion for large parameter variations, which may not be of interest to another user. The prior art does not address how to simultaneously optimize track fusion for different criteria of different users, each having different requirements.

FIG. 4 is a simplified block diagram illustrating a system according to an aspect of the invention. In FIG. 4, the first sensor is designated as "sensor 1," the second is designated as "sensor 2," and other sensors are suggested by the ellipses ending at "sensor f". The sensors may be of any type, including optical, sonar, and radar, and may, for example, include Overhead Non-Imaging InfraRed (ONIR) spacecraft-borne sensors. Sensors 1, 2, . . . , f of FIG. 4 generate measurements representing at least the position of one or more "targets" within their respective fields of view. Those skilled in the art know that the word "target" refers only to an object being tracked, and does not indicate that the object is subject to attack. The sensor may also produce a measurement of the speed of the target, or such speed may be calculated from recurrent position measurements. Examples of two of these sensors are shown as sensors 14 and 16 in FIG. 1. These sensors may be at different locations, and may cover, survey, or view different locations or regions, and such regions may, and often do, overlap. Any target which lies in the overlap region of two or more sensors will generate measurements on the corresponding two or more sensors. In general, as described in the above mentioned U.S. Pat. No. 7,277,047, which is hereby incorporated in its entirety by reference, these measurements may be subject to biases. The biases and other measurement errors may cause the same target to be reported at different locations by different sensors. Such disparate indicated locations may be incorrectly interpreted as being caused by or resulting from the presence of plural targets when in fact there is but one. It will be understood that there will be many situations, both military and commercial, in which it may be important to know the true number of objects associated with plural tracks.

The technique which is used to fuse the information produced by multiple sensors viewing overlapping regions can be either "track fusion" or "measurement fusion/". U.S. Pat. No. 7,009,554, issued Mar. 7, 2006 in the names of Mookerjee and Reifler and entitled "Reduced State Estimation with Multisensor Fusion and Out-of-Sequence Measurements," and hereby incorporated by reference, describes multisensor fusion in the context of out-of-sequence sensor measurements. In the arrangement of FIG. 4, a processor illustrated as a block 412 performs the processing or computation for fusing the information originating with the sensors 1, 2, . . . , f. Since the various sensors may be at different locations, the estimated tracks and associated matrices characterizing the tracks generated by each sensor must be conveyed to the fusion processing location.

Some types of sensors are capable of producing enormous volumes of information and data during surveillance of a region and the tracking of multiple targets. Communications paths generally exist between sensors and fusion processing, and these are often network communication paths, which carry a great deal of information other than sensor track information. In the arrangement of FIG. 1, the network communication paths are depicted as 15 and 17. For many reasons, it is desirable to avoid excessive loading of the network or communication path. This, in turn, means that it may be desirable, if possible, to reduce the bandwidth of the information transmitted over the communication path. With this reduced (or compressed) bandwidth, information can be transmitted in a lesser time over a data path of given capacity, or equivalently, excess path bandwidth over that required to transmit the reduced-bandwidth-information may be used for other purposes.

According to an aspect of the invention, the tracks and associated matrices are generated in a manner similar to, but not the same as, the manner described for elemental enhanced optimal reduced state estimators (ORSE) in the above mentioned U.S. Pat. No. 7,277,047, to thereby reduce the bandwidth requirements of the communication link. According to another aspect of the invention, novel fusion processing is adapted to use the reduced-bandwidth-information.

According to an aspect of the invention, the tracks are considered as being generated by elemental enhanced optimal reduced state estimators (ORSE). An enhanced ORSE considers tracking a target with bounded maneuvers by a sensor which has measurement noise and bounded sensor biases. U.S. Pat. No. 7,180,443, issued Feb. 20, 2007 in the names of Mookerjee and Reifler, and entitled "Reduced State Estimator for Systems with Physically Bounded Parameters," and other works on optimal reduced state estimation (ORSE) have shown that ORSE by its design philosophy provides consistent and optimal estimation often lacking and difficult to attain with Kalman filters in multidimensional state estimation. Thus the consistent and optimal properties of ORSE are brought forth into state estimation with multiple sensors. The ORSE equations for track fusion are summarized in FIGS. 3 and 4 for ready comparison with track fusion algorithms built with Kalman filters.

ORSE Track Fusion according to an aspect of the invention avoids the need for specialized designs by analytic modeling of the physical bounds of the target maneuvers as well as of the sensor biases. Moreover, the applications generalize beyond tracking to estimating the state of any system having parameters and sensor biases that can vary arbitrarily in time within model dependent physical bounds. Furthermore, systems according to aspects of the invention can optimally process sensor measurements that are reported out-of-sequence due to communication delays. ORSE Track Fusion according to an aspect of the invention uses an algorithm with other novel features hitherto lacking in track fusion algorithms built from, or based on, elemental Kalman filters. For tracking a single target with multiple sensors within a Kalman filter framework, the dynamic process model shares a common process noise covariance. That is, the errors in state estimation due to maneuver biases are dependent. As a consequence, optimal fusion of tracks generated by Kalman filters requires transmittal of all the filter gain matrices used to update each sensor track prior to the fusion time. Transmitting the entire history of filter gain matrices defeats a principal purpose of track fusion, which is to reduce the number of bits (or words) that has to be exchanged across the communication link. For this reason, existing art has resorted to suboptimal designs. ORSE Track Fusion according to an aspect of the invention overcomes this disadvantage by propagating, transmitting, and fusing separate covariance matrices for random and bias estimation errors. Furthermore, with ORSE, each sensor can have its own criteria in forming its track, and track fusion can be performed with different criteria at each sensor site or at a central processing site. Thus, ORSE Track Fusion has the flexibility to optimize track fusion simultaneously for multiple criteria, which is a feature not presently available in current tracking systems.

A method according to an aspect of the invention is for determining at least the location of a target by way of Track Fusion, when limited communication bandwidth does not permit sharing of individual measurements from at least two sensors. The method comprises the steps of sensing the target with at least a first sensor to produce measurements, and then processing these measurements by optimal reduced state estimation to produce thereby a first minimal set of target track information, including a first estimated state vector, with at least the location or position of the target as one of its components, as well as associated matrices. The associated matrices consist of a covariance matrix containing mean square errors of the first estimated state vector due to random and bias measurement errors, and a matrix of coefficients relating parameter uncertainty to state estimation error. The method also comprises the step of sensing the target with at least a second sensor, at a different location from the first sensor, to produce measurements, and then processing these measurements by optimal reduced state estimation to produce thereby a second minimal set of target track information, including a second estimated state vector, with at least the location or position of the target as one of its components, as well as associated matrices. The associated matrices consist of a covariance matrix containing mean square errors of the first estimated state vector due to random and bias measurement errors, and a matrix of coefficients relating parameter uncertainty to state estimation error. The first and second minimal sets of track information are transmitted by way of communication paths to user processing sites. At each processing site, the first and second minimal sets of track information are optimally fused according to the separate criteria of each user processing site to produce fused information representing at least the estimated state of the target and the associated covariance. The end use may be, for example, a simple track picture on a radar display console (24 of FIG. 1), or to support a decision process, or to provide inputs to a control system. In a particular use embodiment, the target may be an object (man-made or natural) tracked by radars or other sensors situated in geographically dispersed locations, for generating displays of at least the target location. Such a scenario would be commonplace in a land, water, air, or space situation.

See FIG. 2 for the definitions of the symbols used in the equations below. Consider the problem of estimating the state of a system described by $$x(k+1) = \Phi(T, x(k), \lambda) \tag{58}$$

where:
k=1, 2, 3, . . . is a discrete time index that is generic for any of the processes discussed below;
$\Phi(T,x(k),\lambda)$ is the system transition function;
T is the time between discrete updates;
x(k) is the state vector; and
$\lambda$ are time-varying parameters with known bounds.

The system transition function $\Phi(T,x(k),\lambda)$ depends on the state vector x(k), the time T between discrete updates, and the time-varying parameters $\lambda$ with known bounds. The parameters $\lambda$ vary arbitrarily in time within physical bounds. Such a model typically represents a maneuvering target.

The system is observed by a set of multiple or plural sensors, and measurements $z_i(k)$ at the $k^{th}$ sample of the $i^{th}$ sensor are collected according to $$z_i(k) = H_i x(k) + J_i b_i + n_i(k) \tag{59}$$

where $H_i$ and $J_i$ are measurement matrices corresponding to the particular sensor producing the measurement $z_i(k)$. The measurement bias vector $b_i$ is composed of the biases of the $i^{th}$ sensor. The random measurement noise associated with each measurement $z_i(k)$ is denoted as $n_i(k)$ at the $k^{th}$ sample with covariance $N_i(k)$ for that sensor.

The above mentioned U.S. Pat. No. 7,277,047 applied optimal state estimation for this class of problems considering all random and bias errors, including the bounds on the parameters $\lambda$, expressed by a parameter covariance $\Lambda_i$, as well as the bounds on the biases in the measurements $z_i(k_i)$, expressed by a measurement bias covariance $B_i$ for the $i^{th}$ sensor. The application of optimal state estimation necessitates more than just a simple substitution of ORSE filters for Kalman filters, but also requires fundamental changes to the track fusion algorithm itself. As mentioned, FIGS. 3 and 4 summarize the track fusion algorithm according to an aspect of the invention.

Let the measurements from the multiple sensors i=1, 2, 3, . . . , such as the sensors of set 213 of FIG. 4, be processed by optimal reduced state estimators, such as the ORSE processors of set 220, so that the state estimates along with the associated matrices are propagated to a current time, and so that from each sensor/processor combination a 3-tuple output $\{\hat{x}_i, R_i, D_i\}$ is obtained. The 3-tuples for each sensor i=1, 2, 3, ... are defined as follows:

(1) $\hat{x}_i$=state estimates (2) $R_i$=state covariance due to random and bias measurement errors (3) $D_i$=matrix of bias coefficients due to the uncertain input parameters.

The 3-tuples are applied to paths 15, 17, ..., of FIG. 1, which are the network paths in which the information bandwidth is minimized.

According to an aspect of the invention, the 3-tuples $\{\hat{x}_i, R_i, D_i\}$ are combined and optimally produce the fused 3-tuple output $\{\hat{x}, R, D\}$ on an output path 416 for application to the end user(s), represented in FIG. 4 by a block 412. A fusion processing initialization is required, but need be performed for only the first one of the 3-tuples to be selected for fusion. This initialization is represented by block 410.

The application of ORSE to track fusion according to an aspect of the invention yields an algorithm with novel features hitherto lacking in previous track fusion algorithms built from elemental Kalman filters. By propagating, transmitting, and fusing the 3-tuple outputs $\{\hat{x}_i, R_i, D_i\}$ to obtain the fused 3-tuple output $\{\hat{x}, R, D\}$, ORSE Track Fusion solves the maneuver correlation problem discussed above, and thereby obviates a substantial difficulty of track fusion algorithms built from elemental Kalman filters. Furthermore, each sensor can select its own parameter covariance matrix $\Lambda_i$, and track fusion can be performed with different $\Lambda$ at each sensor site or central processing site. Thus, ORSE Track Fusion according to an aspect of the invention has the flexibility to optimize track fusion simultaneously for multiple criteria, which is a feature not easily available in current tracking systems.

The ORSE processing 300 in FIG. 3 is similar to, but not the same as, the processing described in conjunction with the above mentioned U.S. Pat. No. 7,277,047. This is also represented as ORSE block 220a of FIG. 4. FIG. 3 feeds into FIG. 4, which shows a simplified logic or control flow diagram 400 of this invention.

Operation of the ORSE filter of FIG. 3 begins with an initialization block 310, in which running variables are initialized to base values. The logic then flows to a block 312, representing time update of the measurements. Block 312 calculates $$F_i = \left.\frac{\partial \Phi(T, x, \lambda)}{\partial x}\right|_{x=\hat{x}_i(k|k), \lambda=\bar{\lambda}} \quad (60)$$

where:

$F_i$ is the dynamic matrix;
$\Phi(T,x,\lambda)$ is a general nonlinear function;
T is sampling time;
x is the state vector; and
$\lambda$ is a parameter vector.

Block 312 also calculates $$G_i = \left.\frac{\partial \Phi(T, x, \lambda)}{\partial \lambda}\right|_{x=\hat{x}_i(k|k), \lambda=\bar{\lambda}} \quad (61)$$

The state vector and the associated matrices are then predicted (time updated) according to (' denotes matrix transpose)

$$\hat{x}_i(k+1|k)=\Phi(T,\hat{x}_i(k|k),\bar{\lambda}) \quad (62)$$

$$M_i(k+1|k)=F_i M_i(k|k)F_i' \quad (63)$$

$$D_i(k+1|k)=F_i D_i(k|k)+G_i \quad (64)$$

$$E_i(k+1|k)=F_i E_i(k|k) \quad (65)$$

From block 312 of FIG. 3, the logic 300 flows to a block 314, which represents the ORSE gain computation. By way of calculating intermediate variables $P_i$, $V_i$, $U_i$, $Q_i$ according to $$P_i \stackrel{def}{=} M_i(k+1|k) + D_i(k+1|k)\Lambda_i D_i(k+1|k)' \quad (66)$$

$$V_i \stackrel{def}{=} H_i E_i(k+1|k) + J_i \quad (67)$$

$$U_i \stackrel{def}{=} P_i H_i' + E_i(k+1|k)B_i V_i' \quad (68)$$

$$Q_i = H_i P_i H_i' + V_i B_i V_i' + N_i \quad (69)$$

the fusion gain is computed as $$K_i = U_i(Q_i)^{-1} \quad (70)$$

From gain computation block 314; the logic 300 of FIG. 3 flows by way of a logic path 316 to a measurement update block 318. Block 318 requires the raw measurements, such as target range, angle, range rate (speed), time, and angle rate. Provision of the raw measurements is represented by "Get Measurement from Sensor 14" block 320. Of course, if the logic 300 of FIG. 3 is associated with some sensor other than sensor 14, block 320 should be understood as representing the accessing of measurements from the appropriate sensor. Measurement update of the state in block 318 is performed by $$\hat{x}_i(k+1|k+1)=\hat{x}_i(k+1|k)+K_i[z_i(k+1)-H_i\hat{x}_i(k+1|k)] \quad (71)$$

and by way of defining an intermediate variable $L_i$ according to (I denotes the identity matrix)

$$L_i=I-K_i H_i \quad (72)$$

The error covariance $M_i(k_i+1|k_i+1)$ due to measurement noise $N_i$ is obtained as $$M_i(k+1|k+1)=L_i M_i(k+1|k)L_i'+K_i N_i K_i' \quad (73)$$

The coefficient matrix $D_i(k+1|k+1)$ corresponding to the bias due to the parameter uncertainty is given by $$D_i(k+1|k+1)=L_i D_i(k+1|k) \quad (74)$$

and the coefficient matrix $E_i(k+1|k+1)$ corresponding to the bias due to the sensor bias is given by $$E_i(k+1|k+1)=E_i(k+1|k)-K_i V_i \quad (75)$$

The total covariance $R_i(k+1|k+1)$ due to sensor measurement noise and bias is given by $$R_i(k+1|k+1)=M_i(k+1|k+1)+E_i(k+1|k+1)B_i E_i(k+1|k+1) \quad (76)$$

The logic leaves measurement update block 318 of FIG. 3 and flows by way of a logic path 322 back to block 312 of FIG. 3 to begin another measurement update, and also flows by way of a logic path 323 to a block 324. Thus, logic 300 of FIG. 3 predicts the limited-information-bandwidth 3-tuples $\{\hat{x}_i,$ $R_i$, $D_i$} of track information for each sensor to a current time. These 3-tuples require fewer bits (or words) to transmit than do the measurements upon which they are based. This is advantageous in reducing the bandwidth required to transmit the track information over a network. Block 324 represents the outputting of the 3-tuple {$\hat{x}_1$, $R_1$, $D_1$} (in the case of first sensor 1 of FIG. 1) for the next processing step, which is the step of fusion.

FIG. 4 is a simplified control or logic flow chart or diagram illustrating the processing 400 for fusion of the measurements, predicted to the current time, produced by the various ORSE filters of set 220 of FIG. 3. Each of these filters corresponds with one instance of the logic 300 of FIG. 3. The 3-tuple for the first sensor is used for initializing the fusion algorithm, as represented by block 410 of FIG. 4. The initialization sets $$\{\hat{x}, R, D\} = \{\hat{x}_1, R_1, D_1\} \tag{77}$$

From initialization block 410, the logic of FIG. 4 flows to a block 412.

Fusion algorithm block 412 of FIG. 4 receives initialization information from block 410, together with the updated-to-current-time 3-tuple {$\hat{x}_1$, $R_1$, $D_1$} originating from sensor 14 of FIG. 4 and updated in filter 220a. Then by induction for the remaining sensors recursively set i=2, 3, 4, . . . until all tracks are fused. Thus, fusion algorithm 412 also receives 3-tuples from the ORSE filters 220b through 220f. The fusion is performed by $$Q = R_\# + R_i + (D_\# - D_i)\Lambda(D_\# - D_i)' \tag{78}$$

$$K = [R_\# + D_\#\Lambda(D_\# - D_i)']Q^{-1} \tag{79}$$

$$I - K = [R_i + D_i\Lambda(D_i - D_\#)']Q^{-1} \tag{80}$$

$$R = [I - K]R_\#[I - K]' + KR_iK' \tag{81}$$

$$D = [I - K]D_\# + KD_i \tag{82}$$

$$S = R + D\Lambda D' \tag{83}$$

$$\hat{x} = [I - K]\hat{x}_\# + K\hat{x}_i \tag{84}$$

The state estimate is produced on path 416 for application to the utilization apparatus, such as display apparatus 24 of FIG. 1, and is also fed back to an input of block 412 of FIG. 4 for combining with subsequent filters of set 220.

Various embodiments or aspects of the invention may exhibit the following advantages over the prior art:

1. Each elemental ORSE filter provides the needed consistency for maneuvering targets (covariance overlaps truth);
2. Each elemental ORSE filter can be optimal for maneuvering targets (given optimization criteria);
3. Precision modeling (physical bounds are modeled in each elemental ORSE filter);
4. Flexible criteria (each sensor can have its own criteria in forming its track);
5. Track fusion can be performed with different criteria at each sensor site or central processing site;
6. Track fusion consistency supports decision processes (e.g., collision avoidance in air traffic control context);
7. Consistent and optimal for multisensor track fusion (avoids "Does More Data Always Mean Better Estimates?" paradox);
8. Handles intersensor biases due to uncertain reference frames;
9. Handles biased measurements due to flexure and stresses acting on the sensors;
10. Handles refraction by the medium through which signals travel, which if not accommodated can lead to biased measurements in multisensor tracking contexts.

The following contexts have been identified as being amenable to advantageous use of aspects of the invention a. Radar tracking of surface, air, and space targets
b. Sonar tracking
c. Optical tracking
d. Gridlocking multiple sensors via communication links
e. Common track picture
f. Information fusion
g. Air traffic control
h. Control of large space structures
i. Control of electric power generation
j. Control of nuclear power plants
k. Control of chemical and manufacturing processes
l. Weather prediction

What is claimed is:

1. A method for determining at least the location of a target, when limited communication bandwidth does not permit sharing of individual measurements from at least two sensors; said method comprising the steps of:

sensing the target with a first sensor at a location to produce a first set of measurements;

processing said first set of measurements by optimal reduced state estimation to thereby produce a first minimal set of target track information, including a first estimated state vector, with at least an estimated location or position of the target as one of its components, as well as associated matrices, including a covariance matrix containing mean square errors of the first estimated state vector due to random and bias measurement errors, and a matrix of coefficients relating parameter uncertainty to state estimation error;

sensing the target with at least a second sensor, at a second location, different from said first location, to produce a second set of measurements;

processing said second set of measurements by optimal reduced state estimation to thereby produce at least a second minimal set of target track information, including a second estimated state vector, with at least an estimated location or position of the target as one of its components, as well as associated matrices, including a covariance matrix containing mean square errors of the second estimated state vector due to random and bias measurement errors, and a matrix of coefficients relating parameter uncertainty to state estimation error;

transmitting the first and second minimal sets of track information by way of communication paths from each sensor to a user processing site at a location remote from the location of at least one of said sensors;

selecting at the user processing site, according to its own criteria or requirements, a parameter covariance matrix, representing the physical bounds of time-varying parameters of the target which are unknown, but which are physically constrained to lie within known bounds, and which are distinct from the state variables that are being estimated; and optimally fusing the first and second minimal sets of track information, using the selected parameter covariance matrix, to produce fused information representing at least the estimated state of the target and the associated covariance.

2. A method according to claim 1, wherein: the step of transmitting the first and second minimal sets of track information by way of communication paths from each sensor includes the step of transmitting to a plurality of user processing sites.

3. A method according to claim 1, wherein said step of processing measurements from each sensor comprises the step of optimal reduced state estimation including the steps of:

time updating by $$F_i = \left.\frac{\partial \Phi(T, x, \lambda)}{\partial x}\right|_{x=\hat{x}_i(k|k), \lambda=\bar{\lambda}}$$

where
F$_i$ is the dynamic matrix,
$\phi(T,x,\lambda)$ is a general nonlinear function,
T is sampling time,
x is the state vector, and
$\lambda$ is a parameter vector;
determining the input matrix G$_1$ by $$G_i = \left.\frac{\partial \Phi(T, x, \lambda)}{\partial \lambda}\right|_{x=\hat{x}_i(k|k), \lambda=\bar{\lambda}};$$

determining the time updated state estimate by $$\hat{x}_i(k_i+1|k_i)=\phi(T,\hat{x}_i(k|k),\bar{\lambda})$$

determining the time updated covariance of state estimate due to measurement noise only by $$M_i(k+1|k)=F_iM_i(k|k)F_i'\text{ where }'\text{ denotes transpose;}$$

determining the time updated bias coefficients due to unmodeled dynamics by $$D_i(k+1|k)=F_iD_i(k|k)+G_i$$

determining the time updated bias coefficients due to sensor bias by $$E_i(k+1|k)=F_iE_i(k|k)$$

calculating intermediate variables P$_i$, V$_i$, U$_i$, according to $$P_i \stackrel{def}{=} M_i(k+1|k) + D_i(k+1|k)\Lambda D_i(k+1|k)'$$

$$V_i \stackrel{def}{=} H_iE_i(k+1|k) + J_i \text{ and}$$

$$U_i \stackrel{def}{=} P_iH_i' + E_i(k+1|k)B_iV_i';$$

calculating the innovation covariance $Q_i$ by $$Q_i=H_iP_iH_i'+V_iB_iV_i'+N_i;$$

computing the fusion gain as $$K_i=U_i(Q_i)^{-1}$$

performing measurement update of the states and associated matrices according to $$\hat{x}(k+1|k+1)=\hat{x}(k+1|k)+K_i[z_1(k+1)-H_i\hat{x}_i(k+1k)]$$

$$L_i \stackrel{def}{=} I - K_iH_i \text{ where } I \text{ is an identity matrix}$$

$$M_i(k+1|k+1)=L_iM_i(k+1|k)L_i'+K_iN_iK_i'$$

$$D_i(k+1|k)=L_iD_i(k+1|k)$$

$$E_i(k+1|k+1)=E_i(k+1|k)-K_iV_i$$

$$R_i(k+1|k+1)=M_i(k+1|k+1)+E_i(k+1|k+1)B_iE_i(k+1|k+1)'$$

to thereby predict the limited-information-bandwidth 3-tuples $\{\hat{x}_i, R_i, D_i\}$ of track information for each sensor to a current time.

4. A method according to claim 1, wherein each user processing site selects its own parameter covariance matrix $\Lambda$, according to its own criteria or requirements.

5. A method according to claim 1, wherein said step of optimally fusing to produce fused information representing at least the state and the covariance of said target includes the steps of:

initializing an optimal fusion algorithm by, for the first sensor, initializing $$\{\hat{x}_\#, R_\#, D_\#\}=\{\hat{x}_1, R_1, D_1\}$$

and combining with the second sensor according to $$Q=R_\#+R_2+(D_\#-D_2)\Lambda(D_\#-D_2)'$$

$$K=[R_\#+D_\#\Lambda(D_\#-D_2)']Q^{-1}$$

$$I-K=[R_2+D_2\Lambda(D_2-D_\#)']Q^{-1}$$

$$R=[I-K]R_\#[I-K]'+KR_2K'$$

$$D=[I-K]D_\#+KD_2$$

$$S=R+D\Lambda D'$$

$$\hat{x}=[I-K]\hat{x}_\#+K\hat{x}_2$$

and yielding $\{\hat{x}, R, D\}$ as the output.

6. A method according to claim 1, further comprising the step of displaying said location of said target.

7. A method according to claim 1, wherein said target is a vehicle.

8. A method for determining at least the location of a target, when limited communication bandwidth does not permit sharing of individual measurements from a plurality of sensors including at least two sensors; said method comprising the steps of:

sensing the target with a first sensor at a location to produce a first set of measurements;

processing said first set of measurements by optimal reduced state estimation to thereby produce a first minimal set of target track information, including a first estimated state vector, with at least an estimated location or position of the target as one of its components, as well as associated matrices, including a covariance matrix containing mean square errors of the first estimated state vector due to random and bias measurement errors, and a matrix of coefficients relating parameter uncertainty to state estimation error;

sensing the target with at least a second sensor, at a second location, different from said first location, to produce a second set of measurements;

processing said second set of measurements by optimal reduced state estimation to thereby produce at least a second minimal set of target track information, including a second estimated state vector, with at least an estimated location or position of the target as one of its components, as well as associated matrices, including a covariance matrix containing mean square errors of the second estimated state vector due to random and bias measurement errors, and a matrix of coefficients relating parameter uncertainty to state estimation error;

transmitting the first and second minimal sets of track information by way of communication paths from each sensor to at least one user processing site at a location remote from the location of at least one of said sensors;

selecting at the user processing site, according to its own criteria or requirements, a parameter covariance matrix, representing the physical bounds of time-varying parameters of the target which are unknown, but which are physically constrained to lie within known bounds, and which are distinct from the state variables that are being estimated; and optimally fusing the first and second minimal sets of track information, using the selected parameter covariance matrix, to produce fused information representing at least the estimated state of the target and the associated covariance;

sensing the target with an additional sensor at a location to produce an additional set of measurements;

processing said additional set of measurements by optimal reduced state estimation to thereby produce an additional minimal set of target track information, including an additional estimated state vector, with at least an estimated location or position of the target as one of its components, as well as associated matrices, including a covariance matrix containing mean square errors of the additional estimated state vector due to random and bias measurement errors, and a matrix of coefficients relating parameter uncertainty to state estimation error;

transmitting the additional minimal sets of track information by way of communication paths from the additional sensor to the user processing site; and optimally fusing the first, second, and additional minimal sets of track information, using the selected parameter covariance matrix, to produce fused information representing at least the estimated state of the target and the associated covariance.

9. A method according to claim 8, wherein said steps of sensing the target, processing by optimal reduced state estimation, transmitting, and optimally fusing are repeated until the track information from all sensors sensing a target are optimally fused, using the selected parameter covariance matrix at said user processing site, to produce fused information representing at least the estimated state of the target and the associated covariance.

10. A method according to claim 8, wherein said target is a vehicle.

11. A method according to claim 8, wherein: the step of transmitting the first and second minimal sets of track information by way of communication paths from each sensor includes the step of transmitting to a plurality of user processing sites.

12. A method according to claim 8, wherein said step of processing measurements from each sensor comprises the step of optimal reduced state estimation including the steps of:

time updating by $$F_i = \frac{\partial \Phi(T, x, \lambda)}{\partial x}\bigg|_{x=\hat{x}_i(k|k), \lambda=\hat{\lambda}}$$

where $F_i$ is the dynamic matrix, $\phi(T,x,\lambda)$ is a general nonlinear function, T is sampling time, x is the state vector, and $\lambda$ is a parameter vector;

determining the input matrix $G_1$ by $$G_i = \frac{\partial \Phi(T, x, \lambda)}{\partial \lambda}\bigg|_{x=\hat{x}_i(k|k), \lambda=\overline{\lambda}};$$

determining the time updated state estimate by $\hat{x}_i(k+1|k) = \phi(T, \hat{x}_i(k|k), \overline{\lambda})$ determining the time updated covariance of state estimate due to measurement noise only by $M_i(k+1|k) = F_i M_i(k|k) F_i'$ where ' denotes transpose;

determining the time updated bias coefficients due to unmodeled dynamics by $D_i(k+1|k) = F_i D_i(k|k) + G_i$;

determining the time updated bias coefficients due to sensor bias by $E_i(k+1|k) = F_i E_i(k|k)$ calculating intermediate variables $P_i$, $V_i$, $U_i$, according to $$P_i \stackrel{def}{=} M_i(k+1|k) + D_i(k+1|k)\Lambda D_i(k+1|k)'$$

$$V_i \stackrel{def}{=} H_i E_i(k+1|k) + J_i \text{ and}$$

$$U_i \stackrel{def}{=} P_i H_i' + E_i(k+1|k)B_i V_i';$$

calculating the innovation covariance $Q_i$ by $Q_i = H_i P_i H_i' + V_i B_i V_i' + N_i$;

computing the fusion gain as $K_i = U_i(Q_i)^{-1}$ performing measurement update of the states and associated matrices according to $\hat{x}_i(k+1|k+1) = \hat{x}_i(k+1|k) + K_i[z_i(k+1) - H_i\hat{x}_i(k+1|k)]$ $L_i \stackrel{def}{=} I - K_i H_i$ where $I$ is an identity matrix $M_i(k_i+1|k_i+1) = L_i M_i(k_1+1|k) L_i' + K_i N_i K_i'$ $D_i(k_i+1|k_i+1) = L_i D_i(k_i+1|k)$ $E_i(k_i+1|k_i+1) = E_i(k_i+1|k_i) - K_i V_i$ $R_i(k_i+1|k_i+1) = M_i(k_i+1|k_i+1) + E_i(k_i+1|k_i+1)B_i E_i(k_i+1|k_i+1)$ to thereby predict the limited-information-bandwidth 3-tuples $\{\hat{x}_i, R_i, D_i\}$ of track information for each sensor to a current time.

13. A method according to claim 8, wherein each user processing site selects its own parameter covariance matrix $\Lambda$, according to its own criteria or requirements.

14. A method according to claim 1, wherein said step of optimally fusing as many sets of minimal track information as the number of sensors sensing said target to produce fused information representing at least the state and the covariance of said target includes the steps of:

initializing an optimal fusion algorithm by, for the first sensor, initializing $$\{\hat{x}_\#, R_\#, D_\#\} = \{\hat{x}_1, R_1, D_1\}$$

combining with the $i^{th}$ sensor, $i=2, 3, 4, \ldots$ according to $$Q = R_\# + R_i + (D_\# - D_i)\Lambda(D_\# - D_i)'$$

$$K = [R_\# + D_\#\Lambda(D_\# - D_i)']Q^{-1}$$

$$I - K = [R_i + D_i\Lambda(D_i - D_\#)']Q^{-1}$$

$$R = [I-K]R_\#[I-K]' + KR_iK'$$

$$D = [I-K]D_\# + KD_i$$

$$S = R + D\Lambda D'$$

$$\hat{x} = [I-K]\hat{x}_\# + K\hat{x}_i$$

resetting $$R_\# =$$

$$D_\# = D$$

$$\hat{x}_\# = \hat{x}$$

and looping back to $Q = R_\# + R_i + (D_\# - D_i)\Lambda(D_\# - D_i)'$ for the remaining sensor tracks until all tracks are fused and yielding $\{\hat{x}, R, D\}$ as the output.

15. A method for determining the location of a target, said method comprising the steps of:
- sensing the target with a first sensor to produce a first set of measurements;
- processing the first set of measurements by optimal reduced state estimation to produce a first minimal set of target track information;
- sensing the target with at least a second sensor to produce at least a second set of measurements;
- processing the at least second set of measurements by optimal reduced state estimation to produce at least a second minimal set of target track information; and
- optimally fusing the first and at least second minimal sets of track information, using a selected parameter covariance matrix representing the physical bounds of the target, to produce fused information representing at least the estimated state of the target and the associated covariance.

16. The method according to claim 15, wherein the first minimal set of target track information includes a first estimated state vector, a covariance matrix containing mean square errors of the first estimated state vector, and a matrix of coefficients relating parameter uncertainty to state estimation error, and the at least second minimal set of target track information includes at least a second estimated state vector, a covariance matrix containing mean square errors of the at least second estimated state vector, and a matrix of coefficients relating parameter uncertainty to state estimation error.

17. The method according to claim 15, wherein prior to the optimally fusing step, further comprising the steps of:
- transmitting the first and at least second minimal sets of track information from each sensor to a user processing site; and
- selecting at the user processing site the parameter covariance matrix.

18. A system for determining the location of a target, said system comprising:
- a first sensor for sensing the target to produce a first set of measurements;
- at least a second sensor for sensing the target to produce at least a second set of measurements;
- a processor for processing said first set of measurements by optimal reduced state estimation to produce a first minimal set of target track information;
- processors for processing each of the first and second sets of measurements by optimal reduced state estimation to produce minimal sets of target track information; and
- a processor for optimally fusing the first and at least second minimal sets of track information, using a selected parameter covariance matrix representing the physical bounds of the target, to produce fused information representing at least the estimated state of the target and the associated covariance.

19. The system according to claim 18, wherein the first minimal set of target track information includes a first estimated state vector, a covariance matrix containing mean square errors of the first estimated state vector, and a matrix of coefficients relating parameter uncertainty to state estimation error, and the at least second minimal set of target track information includes at least a second estimated state vector, a covariance matrix containing mean square errors of the at least second estimated state vector, and a matrix of coefficients relating parameter uncertainty to state estimation error.

20. The system according to claim 18, further comprising a network for transmitting the first and at least second minimal sets of track information from each sensor to a user processing site, the user processing site including the processor for optimally fusing the first and at least second minimal sets of track information.

* * * * *